United States Patent
Bellino et al.

(10) Patent No.: US 9,664,392 B2
(45) Date of Patent: May 30, 2017

(54) BUNDLED TUBE FUEL INJECTOR WITH OUTER SHROUD AND OUTER BAND CONNECTION

(71) Applicant: General Electric Company, Schenectady, NY (US)

(72) Inventors: Mark Carmine Bellino, Greenville, SC (US); James Christopher Monaghan, Moore, SC (US); Johnie F. McConnaughhay, Greenville, SC (US); Steven Charles Woods, Easley, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 293 days.

(21) Appl. No.: 14/105,339

(22) Filed: Dec. 13, 2013

(65) Prior Publication Data

US 2015/0167982 A1  Jun. 18, 2015

(51) Int. Cl.
*F23R 3/28* (2006.01)
*F02C 3/14* (2006.01)

(52) U.S. Cl.
CPC ............... *F23R 3/283* (2013.01); *F02C 3/14* (2013.01); *F23R 3/286* (2013.01); *F23R 2900/00017* (2013.01)

(58) Field of Classification Search
CPC .. F23R 3/283; F23R 3/286; F23R 3/00; F23R 3/04; F23R 3/045; F23R 3/10; F23R 3/30; F23R 3/32; F23R 3/42; F23R 3/46; F23R 2900/00017; F23R 2900/00018; F23R 2900/00019; F02C 7/20; F02C 7/222; F23D 14/62; F23D 14/64; F02M 61/14

See application file for complete search history.

(56) References Cited

U.S. PATENT DOCUMENTS

| | | | |
|---|---|---|---|
| 1,875,142 A | 8/1932 | Price | |
| 2,048,351 A | 7/1936 | Melberg | |
| 3,074,873 A | 1/1963 | Kling et al. | |
| 4,441,323 A * | 4/1984 | Colley | F23R 3/283 60/737 |
| 5,432,828 A | 7/1995 | Cayment et al. | |
| 6,148,604 A * | 11/2000 | Salt | F01D 9/023 60/39.37 |
| 6,298,667 B1 * | 10/2001 | Glynn | F23R 3/002 29/889.2 |
| 6,341,485 B1 * | 1/2002 | Liebe | F23R 3/002 60/760 |

(Continued)

*Primary Examiner* — William H Rodriguez
(74) *Attorney, Agent, or Firm* — Dority & Manning, PA

(57) ABSTRACT

A bundled tube fuel injector includes an outer band that circumferentially surrounds a fuel plenum defined within the bundled tube fuel injector. The outer band includes a forward end portion that is axially separated from an aft end portion. A plurality of pre-mix tubes extends through the fuel plenum substantially parallel to one another. A first segment of the plurality of pre-mix tubes is circumferentially surrounded by the outer band. An outer shroud extends circumferentially around a second segment of the pre-mix tubes. The outer shroud includes a forward portion and an aft portion. The aft end portion of the outer band is coupled to the forward portion of the outer shroud via a plurality of fasteners for enhanced assembly and reparability.

20 Claims, 6 Drawing Sheets

(56) References Cited

U.S. PATENT DOCUMENTS

| | | | | |
|---|---|---|---|---|
| 6,645,214 B2* | 11/2003 | Brown | A61B 19/46 | 606/102 |
| 8,020,297 B2 | 9/2011 | Yoshino | | |
| 8,205,452 B2* | 6/2012 | Boardman | F23R 3/12 | 60/737 |
| 8,261,555 B2* | 9/2012 | Uhm | F23D 14/62 | 60/737 |
| 8,438,851 B1* | 5/2013 | Uhm | F23R 3/04 | 60/737 |
| 9,316,397 B2* | 4/2016 | Stewart | F23R 3/283 | |
| 2010/0139280 A1* | 6/2010 | Lacy | F23D 14/82 | 60/737 |
| 2011/0197587 A1* | 8/2011 | Zuo | F23D 14/02 | 60/740 |
| 2013/0045450 A1* | 2/2013 | Uhm | F23R 3/26 | 431/8 |
| 2013/0167539 A1* | 7/2013 | Berry | F23R 3/286 | 60/737 |
| 2013/0283810 A1* | 10/2013 | Idahosa | F23R 3/286 | 60/776 |
| 2014/0116066 A1* | 5/2014 | Melton | F23R 3/28 | 60/806 |
| 2014/0157779 A1* | 6/2014 | Uhm | F23R 3/10 | 60/725 |
| 2014/0260267 A1* | 9/2014 | Melton | F23R 3/10 | 60/737 |
| 2014/0260271 A1* | 9/2014 | Keener | F23R 3/10 | 60/737 |
| 2014/0338339 A1* | 11/2014 | Westmoreland | F23R 3/12 | 60/737 |
| 2014/0338344 A1* | 11/2014 | Stewart | F23R 3/10 | 60/747 |
| 2014/0338354 A1* | 11/2014 | Stewart | F23R 3/286 | 60/776 |
| 2014/0338356 A1* | 11/2014 | Keener | F23R 3/286 | 60/776 |
| 2015/0000286 A1* | 1/2015 | LeBegue | F23R 3/28 | 60/742 |
| 2015/0076251 A1* | 3/2015 | Berry | F23R 3/10 | 239/418 |
| 2015/0089954 A1* | 4/2015 | Widenhorn | F23R 3/283 | 60/776 |
| 2015/0165568 A1* | 6/2015 | Means | B23P 6/002 | 29/402.06 |
| 2015/0167556 A1* | 6/2015 | Bellino | F23R 3/286 | 29/426.4 |
| 2015/0167981 A1* | 6/2015 | Woods | F02M 61/14 | 60/735 |
| 2015/0167982 A1* | 6/2015 | Bellino | F23R 3/283 | 60/726 |
| 2015/0167983 A1* | 6/2015 | McConnaughhay | F23R 3/283 | 60/726 |

* cited by examiner

BUNDLED TUBE FUEL INJECTOR WITH OUTER SHROUD AND OUTER BAND CONNECTION

FIELD OF THE INVENTION

The present invention generally involves a bundled tube fuel injector assembly such as may be incorporated into a combustor of a gas turbine or other turbomachine. More specifically, the invention relates to a bundled tube fuel injector having an outer shroud configuration for enhanced reparability.

BACKGROUND OF THE INVENTION

Gas turbines are widely used in industrial and power generation operations. A typical gas turbine may include a compressor section, a combustion section disposed downstream from the compressor section, and a turbine section disposed downstream from the combustion section. A working fluid such as ambient air flows into the compressor section where it is progressively compressed before flowing into the combustion section. The compressed working fluid is mixed with a fuel and burned within one or more combustors of the combustion section to generate combustion gases having a high temperature, pressure, and velocity. The combustion gases flow from the combustors and expand through the turbine section to produce thrust and/or to rotate a shaft, thus producing work.

The combustors may be annularly arranged between the compressor section and the turbine section. In a particular combustor design, the combustors include one or more axially extending bundled tube fuel injectors that extend downstream from an end cover.

The bundled tube fuel injector generally includes a plurality of pre-mix tubes arranged radially and circumferentially across the bundled tube fuel injector. The pre-mix tubes extend generally parallel to one another. An outer shroud extends circumferentially around the pre-mix tubes downstream from a fuel distribution module of the bundled tube fuel injector. An aft plate extends radially and circumferentially across a downstream end of the outer shroud adjacent to a combustion chamber or zone defined within the combustor. A cooling air or purge air plenum is at least partially defined within the outer shroud between the fuel distribution manifold and the aft plate. In a conventional bundled tube fuel injector, a downstream or end portion of each pre-mix tube extends through the aft plate such that an outlet of each tube is downstream from a hot side surface of the aft plate, thus providing for fluid communication into the combustion chamber or zone.

Each of the pre-mix tubes extends generally axially through the fuel distribution module and the cooling air plenum. The compressed working fluid is routed through inlets of each of the parallel pre-mix tubes upstream from the fuel distribution module. Fuel is supplied to the fuel plenum through the fluid conduit and the fuel is injected into the pre-mix tubes through one or more fuel ports defined within each of the pre-mix tubes. The fuel and compressed working fluid mix inside the pre-mix tubes before flowing out of the outlet which is defined at the downstream or end portion of each of the pre-mix tubes and into the combustion chamber or zone for combustion.

In current bundled tube fuel injector designs, the outer shroud is welded to the fuel distribution module which adds to assembly time and costs. In addition, the outer shroud and/or the weld joint must be cut through via machining or other cutting method and removed from the bundled tube fuel injector to expose the pre-mix tubes for inspection, repair or replacement. However, the cutting process may result in irreparable damage to the outer shroud and/or may require multiple costly and time consuming machining steps such as polishing, grinding and welding in order to prep and reassemble the bundled tube fuel injector. Therefore, an improved bundled tube fuel injector that does not require welding of the outer shroud to the fuel distribution module and/or cutting of the outer shroud to expose the pre-mix tubes would be useful.

BRIEF DESCRIPTION OF THE INVENTION

Aspects and advantages of the invention are set forth below in the following description, or may be obvious from the description, or may be learned through practice of the invention.

One embodiment of the present invention is a bundled tube fuel injector. The bundled tube fuel injector includes an outer band that circumferentially surrounds a fuel plenum defined within the bundled tube fuel injector. The outer band includes a forward end portion that is axially separated from an aft end portion. A plurality of pre-mix tubes extends through the fuel plenum substantially parallel to one another. A first segment of the plurality of pre-mix tubes is circumferentially surrounded by the outer band. An outer shroud extends circumferentially around a second segment of the pre-mix tubes. The outer shroud includes a forward portion and an aft portion. The aft end portion of the outer band is coupled to the forward portion of the outer shroud via a plurality of fasteners for enhanced assembly and reparability.

Another embodiment of the present disclosure is a combustor having an end cover coupled to an outer casing that surrounds the combustor. A bundled tube fuel injector is coupled to the end cover and extends axially downstream from the end cover. The bundled tube fuel injector includes an outer band that circumferentially surrounds a fuel plenum defined within the bundled tube fuel injector. The outer band includes a forward end portion that is axially separated from an aft end portion. A plurality of pre-mix tubes extends through the fuel plenum substantially parallel to one another. A first segment of the plurality of pre-mix tubes is circumferentially surrounded by the outer band. An outer shroud extends circumferentially around a second segment of the pre-mix tubes. The outer shroud includes a forward portion and an aft portion. The aft end portion of the outer band is coupled to the forward portion of the outer shroud via a plurality of fasteners for enhanced assembly and reparability.

Another embodiment of the present invention includes a gas turbine having a compressor, a combustor disposed downstream from the compressor and a turbine disposed downstream from the combustor. The combustor is surrounded by an outer casing and an end cover that is coupled to the outer casing. The combustor comprises a bundled tube fuel injector that is coupled to the end cover and that extends axially downstream from the end cover. The bundled tube fuel injector includes an outer band that circumferentially surrounds a fuel plenum defined within the bundled tube fuel injector. The outer band includes a forward end portion that is axially separated from an aft end portion. A plurality of pre-mix tubes extends through the fuel plenum substantially parallel to one another. A first segment of the plurality of pre-mix tubes is circumferentially surrounded by the outer band. An outer shroud extends circumferentially around a second segment of the pre-mix tubes. The outer shroud includes a forward portion and an aft portion. The aft end portion of the outer band is coupled to the forward portion of the outer shroud via a plurality of fasteners for enhanced assembly and reparability.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
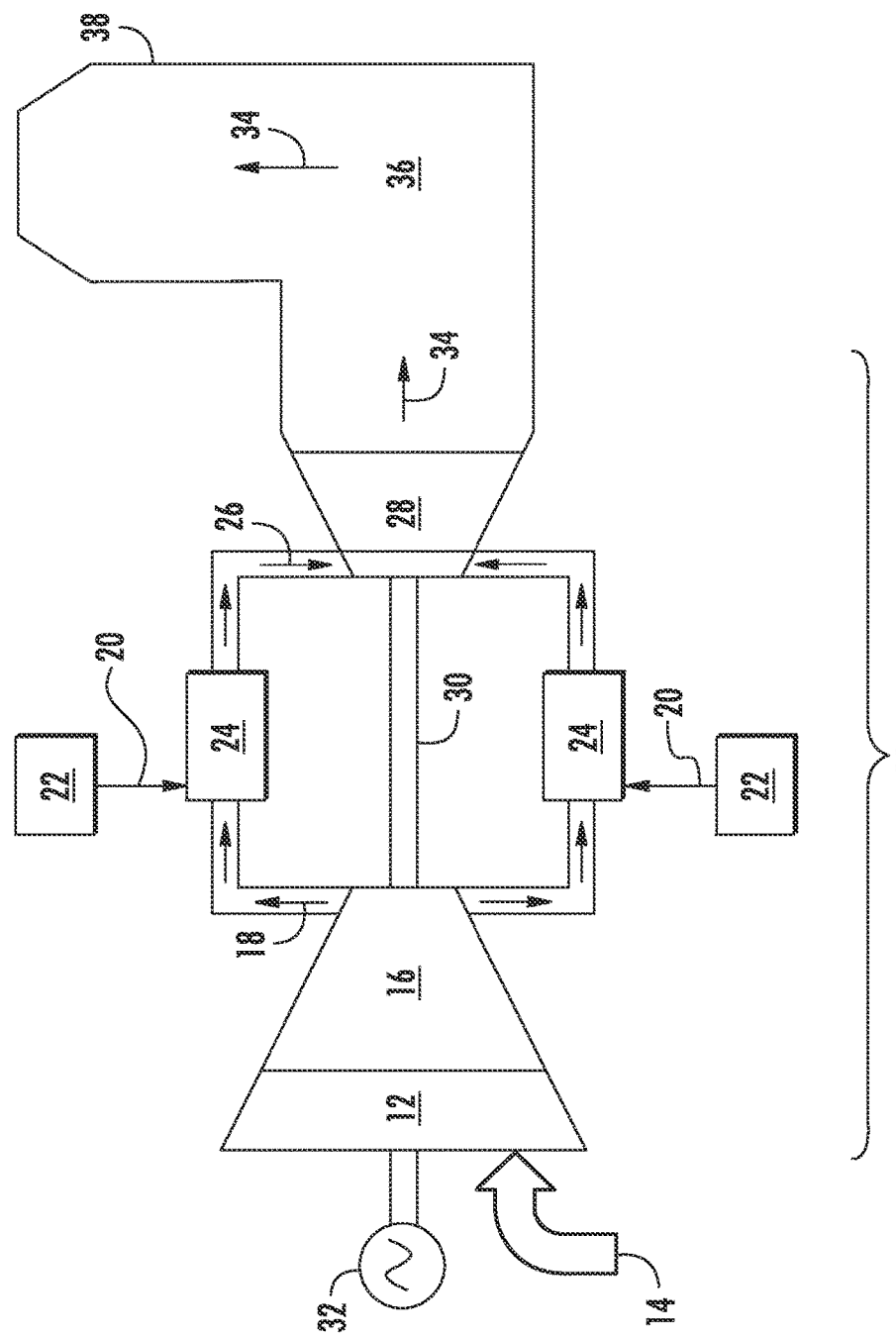
FIG. 1 provides a functional block diagram of an exemplary gas turbine that may incorporate various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Although exemplary embodiments of the present invention will be described generally in the context of a bundled tube fuel injector incorporated into a combustor of a gas turbine for purposes of illustration, one of ordinary skill in the art will readily appreciate that embodiments of the present invention may be applied to any combustor incorporated into any turbomachine and are not limited to a gas turbine combustor unless specifically recited in the claims.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18.

The compressed working fluid 18 is mixed with a fuel 20 from a fuel source 22 such as a fuel skid to form a combustible mixture within one or more combustors 24. The combustible mixture is burned to produce combustion gases 26 having a high temperature, pressure and velocity. The combustion gases 26 flow through a turbine 28 of a turbine section to produce work. For example, the turbine 28 may be connected to a shaft 30 so that rotation of the turbine 28 drives the compressor 16 to produce the compressed working fluid 18. Alternately or in addition, the shaft 30 may connect the turbine 28 to a generator 32 for producing electricity. Exhaust gases 34 from the turbine 28 flow through an exhaust section 36 that connects the turbine 28 to an exhaust stack 38 downstream from the turbine 28. The exhaust section 36 may include, for example, a heat recovery steam generator (not shown) for cleaning and extracting additional heat from the exhaust gases 34 prior to release to the environment.

Figure 2:
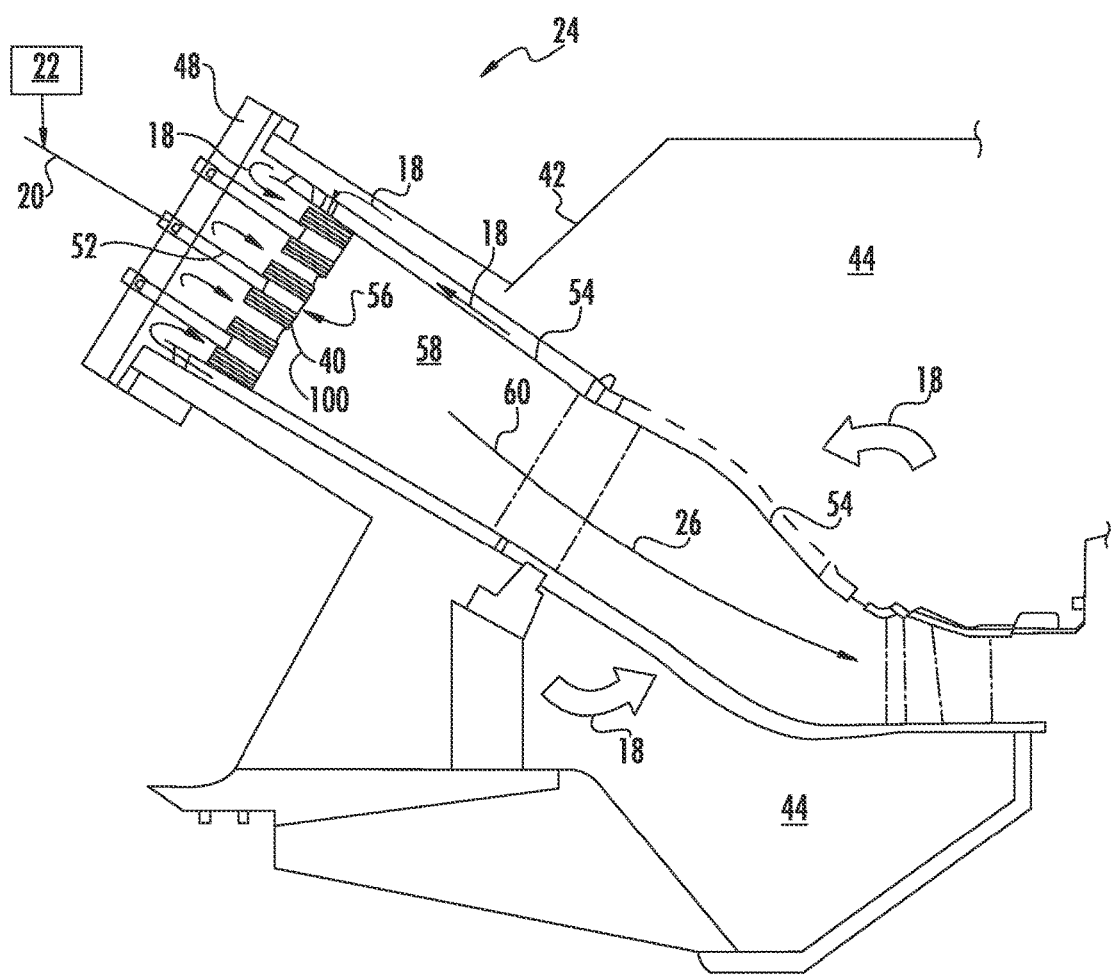
FIG. 2 is a simplified cross-section side view of an exemplary combustor as may incorporate various embodiments of the present invention.

FIG. 2 provides a simplified cross section of an exemplary combustor 24 as may incorporate a bundled tube fuel injector 40 configured according to at least one embodiment of the present disclosure. As shown, the combustor 24 is at least partially surrounded by an outer casing 42. The outer casing 42 at least partially forms a high pressure plenum 44 around the combustor 24. The high pressure plenum 44 may be in fluid communication with the compressor 16 or other source for supplying the compressed working fluid 18 to the combustor 24. In one configuration, an end cover 48 is coupled to the outer casing 42. The end cover 48 may be in fluid communication with the fuel supply 22.

The bundled tube fuel injector 40 extends downstream from the end cover 48. The bundled tube fuel injector 40 may be fluidly connected to the end cover 48 so as to receive fuel from the fuel supply 22. For example, a fluid conduit 52 may provide for fluid communication between the end cover 48 and/or the fuel supply 22 and the bundled tube fuel injector 40. One end of an annular liner 54 such as a combustion liner and/or a transition duct surrounds a downstream end 56 of the bundled tube fuel injector 40 so as to at least partially define a combustion chamber 58 within the combustor 24. The liner 54 at least partially defines a hot gas path 60 for directing the combustion gases 26 from the combustion chamber 58 through the combustor 24. For example, the hot gas path 60 may be configured to route the combustion gases 26 towards the turbine 28 and/or the exhaust section.

In operation, the compressed working fluid 18 is routed towards the end cover 48 where it reverses direction and flows through one or more of the bundled tube fuel injectors 40. The fuel 20 is provided to the bundled tube fuel injector 40 and the fuel 20 and the compressed working fluid 18 are premixed or combined within the bundled tube fuel injector 40 before being injected into a combustion chamber 58 for combustion.

Figure 3:
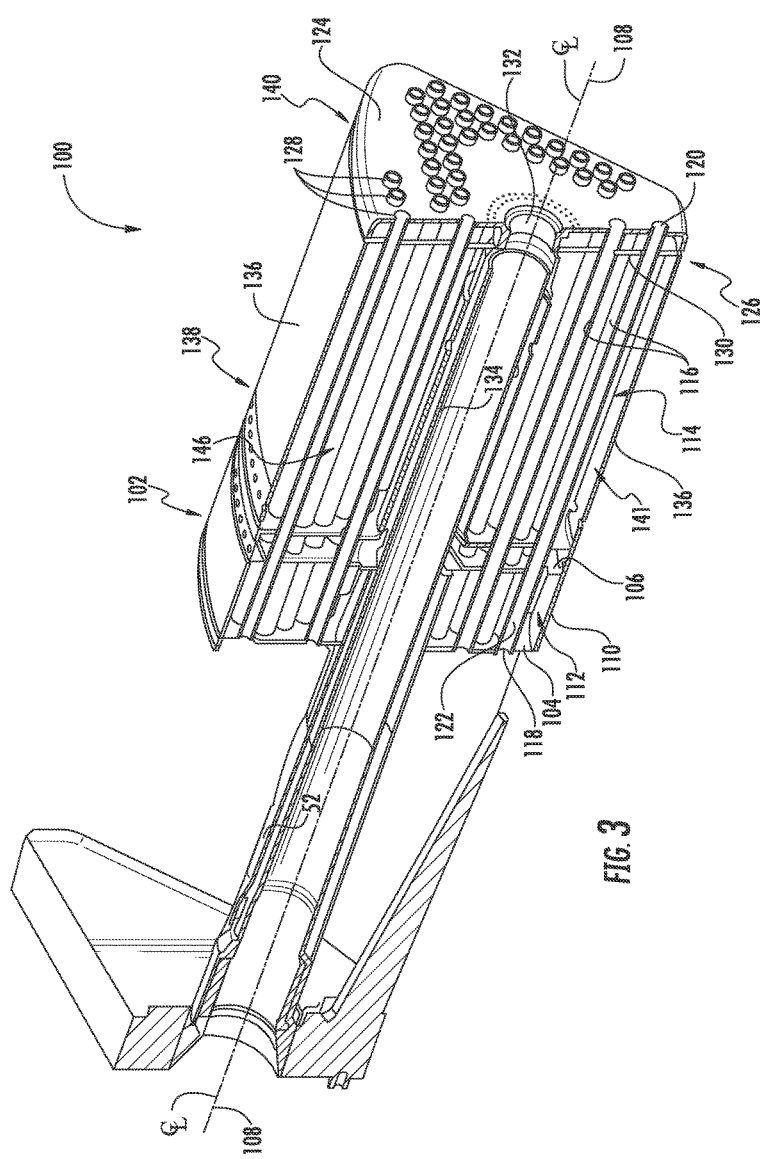
FIG. 3, is a cross section perspective view of an exemplary bundled tube fuel injector according to one embodiment of the present invention.

FIG. 3 is a cross section perspective view of an exemplary bundled tube fuel injector 100 herein referred to as "fuel injector" as may be incorporated into the combustor 24 as described in FIG. 2, according to various embodiments of the present disclosure. As shown, the fuel injector 100 generally includes a fuel distribution module 102 that is in fluid communication with the fluid conduit 52. In particular embodiments, the fuel distribution module 102 includes an upstream plate 104 that is axially separated from a downstream plate 106. The upstream and downstream plates 104, 106 extend generally radially and circumferentially within the fuel injector 100 with respect to an axial centerline 108 of the fuel injector 100. An outer band 110 circumferentially surrounds and extends axially between the upstream and downstream plates 104, 106. The outer band 110 may extend axially beyond either one or both of the upstream and downstream plates 104, 106. A fuel plenum 112 is at least partially defined between the upstream and downstream plates 104, 106 and the outer band 110. The fluid conduit 52 provides for fluid communication between the fuel supply 22 (FIG. 1) and the fuel plenum 112.

As shown in FIG. 3, the fuel injector 100 includes a pre-mix tube bundle 114. The pre-mix tube bundle 114 comprises a plurality of pre-mix tubes 116 that extend generally parallel to one another along or parallel to the axial centerline 116 of the fuel injector 100. The pre-mix tubes 116 extend downstream from the fuel plenum 112. A portion of the pre-mix tubes 116 extends through the fuel plenum 112 such that a first segment of the pre-mix tubes 116 are circumferentially surrounded by the outer band 110.

The pre-mix tubes 116 may be formed from a single continuous tube or may be formed from two or more coaxially aligned tubes fixedly joined together. Although generally illustrated as cylindrical, the pre-mix tubes 116 may be any geometric shape, and the present invention is not limited to any particular cross-section unless specifically recited in the claims. In addition, the pre-mix tubes 116 may be grouped or arranged in circular, triangular, square, or other geometric shapes, and may be arranged in various numbers and geometries.

An exemplary pre-mix tube 116, as shown in FIG. 3, generally includes an inlet 118 defined upstream from the fuel plenum 112 and/or the upstream plate 104. The inlet 118 may be in fluid communication with the high pressure plenum 44 and/or the compressor 16. A downstream or end portion 120 is defined downstream from the fuel plenum 112. One or more fuel ports 122 may provide for fluid communication between the fuel plenum 112 and a corresponding pre-mix passage 142 within the pre-mix tubes 116.

In particular configurations, an aft plate 124 is disposed at a downstream or aft end 126 of the fuel injector 100. The aft plate 124 extends radially outwardly and circumferentially across the aft end 126 with respect the axial centerline 108 of the fuel injector 100. The aft plate 124 at least partially defines a plurality of tube tip passages 128 that extend generally axially through the aft plate 124. The downstream or end portion 120 of the pre-mix tubes 116 may extend through a corresponding tube tip passage 128.

In particular embodiments, an impingement plate 130 is disposed upstream from the aft plate 124. The impingement plate 130 may be welded, brazed or otherwise coupled to the aft plate 124. The aft plate 124 and/or the impingement plate 130 may at least partially define a fluid cartridge or fuel nozzle passage 132 that extends generally axially therethrough. A fluid cartridge or center fuel nozzle 134 may be coupled to the aft plate 124 at the fluid cartridge passage 132. An outer shroud 136 extends generally axially between the fuel distribution module 102 and the aft plate 124. The outer shroud 136 includes a forward portion 138 and an aft portion 140. The aft plate 124 extends radially and circumferentially across the aft end portion 140 of the outer shroud 136. When assembled to the fuel injector 100, the outer shroud 136 extends circumferentially around a second segment of the pre-mix tubes 116. A cooling or purge air plenum 141 may be at least partially defined between the outer shroud 136, the aft plate 124 and/or the impingement plate 130.

Figure 4:
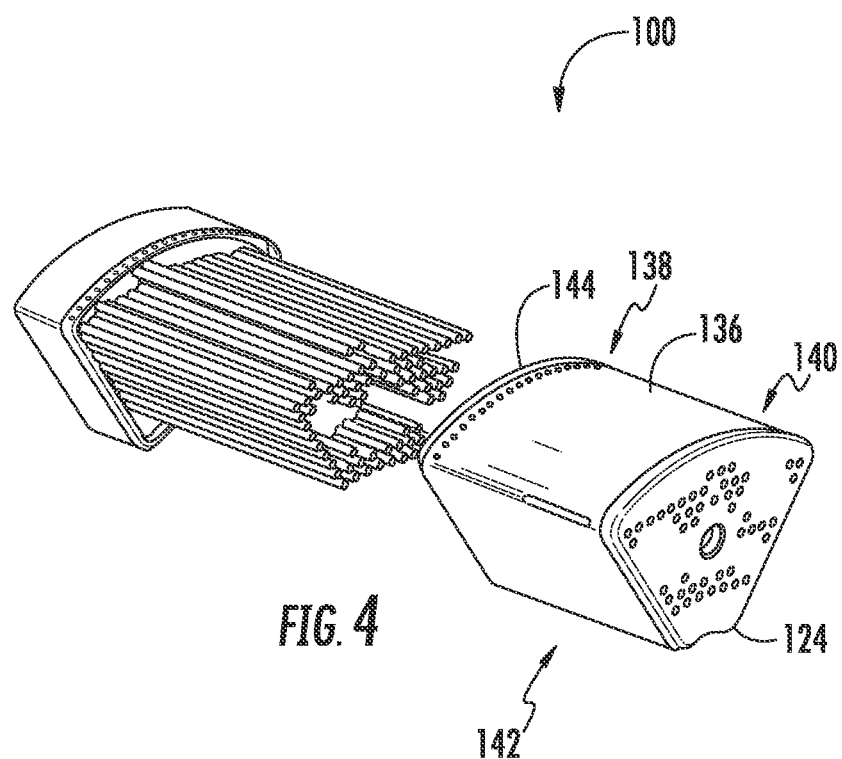
FIG. 4 is a partially exploded perspective view of the fuel injector 100 as shown in FIG. 3, according to various embodiments of the present disclosure.

FIG. 4 is a partially exploded perspective view of the fuel injector 100 as shown in FIG. 3, according to various embodiments of the present disclosure. As shown in FIG. 4, the outer shroud 136 and the aft plate 124 may be provided as a shroud assembly 142. In the alternative, the outer shroud 136 may be provided as a singular component. The shroud assembly 142 also may include the impingement plate 130 (FIG. 3) and/or an alignment plate 144 (FIGS. 3 and 4). The aft plate 124 may be coupled to the outer shroud 136 via welding, brazing, mechanical fasteners or by any suitable means for the operating environment of the fuel injector 100.

Figure 5:
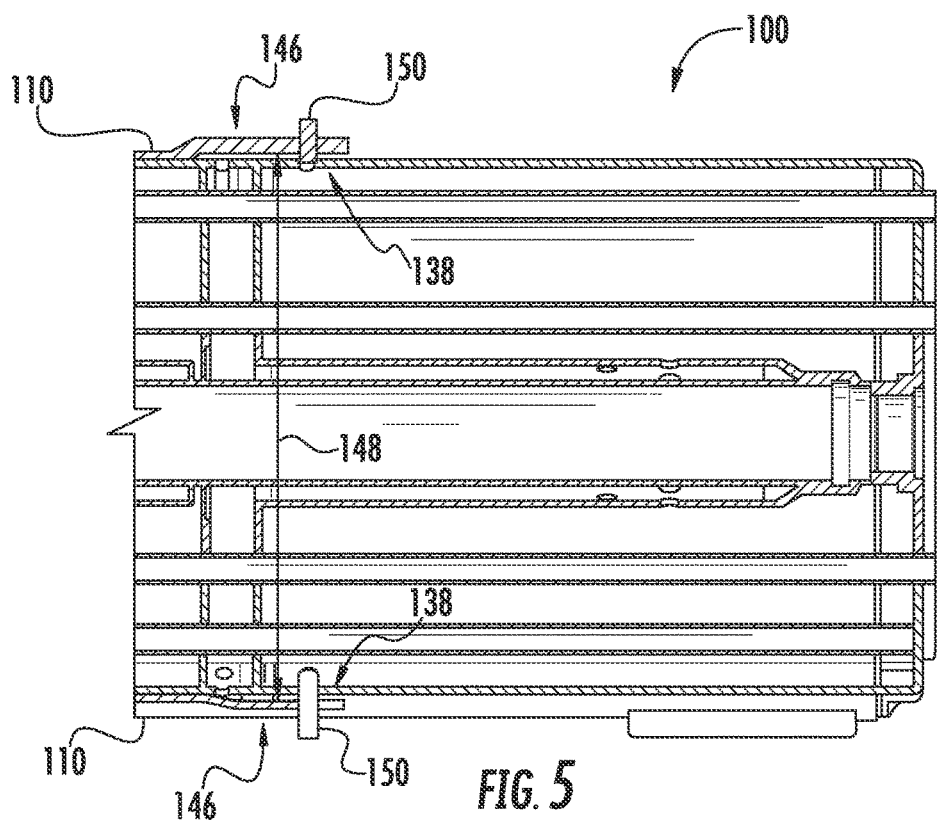
FIG. 5 is an enlarged cross section side view of a portion of the fuel injector as shown in FIG. 3, according to one embodiment of the present invention.
Figure 6:
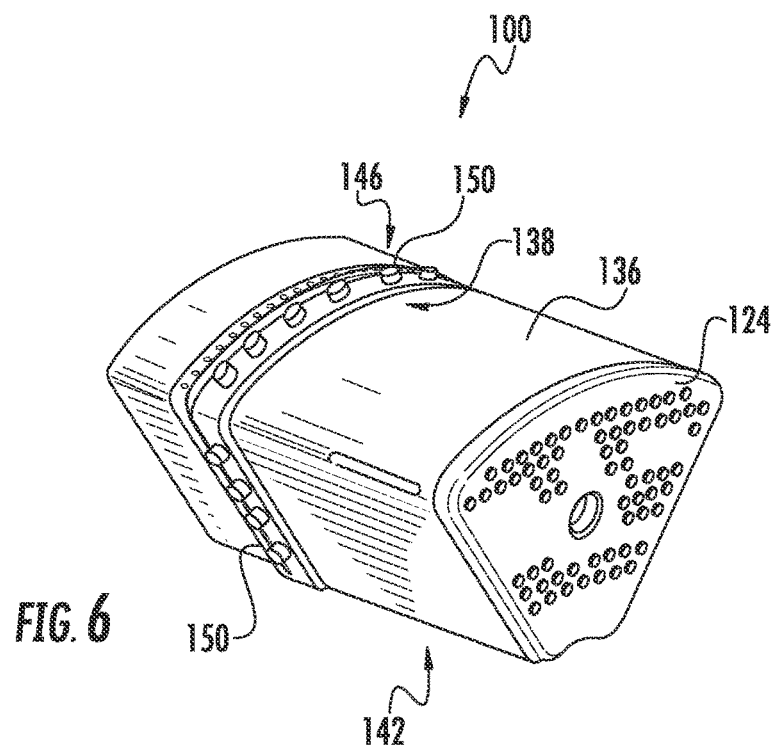
FIG. 6 is a perspective side view of the fuel injector as shown in FIG. 3, according to one embodiment of the present invention.

FIG. 5 provides an enlarged cross section side view of a portion of the fuel injector 100 as shown in FIG. 3, according to one embodiment of the present invention, and FIG. 6 provides a perspective side view of the fuel injector 100 as shown in FIG. 3, according to one embodiment of the present invention. In one embodiment, as shown in FIGS. 5 and 6, the outer band 110 of the fuel distribution module 102 is configured to receive at least a portion of the forward portion 138 of the outer shroud 136. For example, an aft end 146 portion of the outer band 110 may form a socket 148. The socket 148 has an inner diameter at the aft end 146 that is greater than an outer diameter of the outer shroud 136 at the forward portion 138. When assembled, the forward portion 138 of the outer shroud 136 is seated within the socket 148. The outer band 110 and the outer shroud may be coupled together via one or more fasteners 150. The fasteners 150 may comprise pins, bolts, screws, spring loaded connectors or any type of connector that may be removed without requiring cutting or modification of the outer band and/or the outer shroud. In one embodiment, the fasteners extend generally radially through and/or between the outer band 110 and the outer shroud 136.

Figure 7:
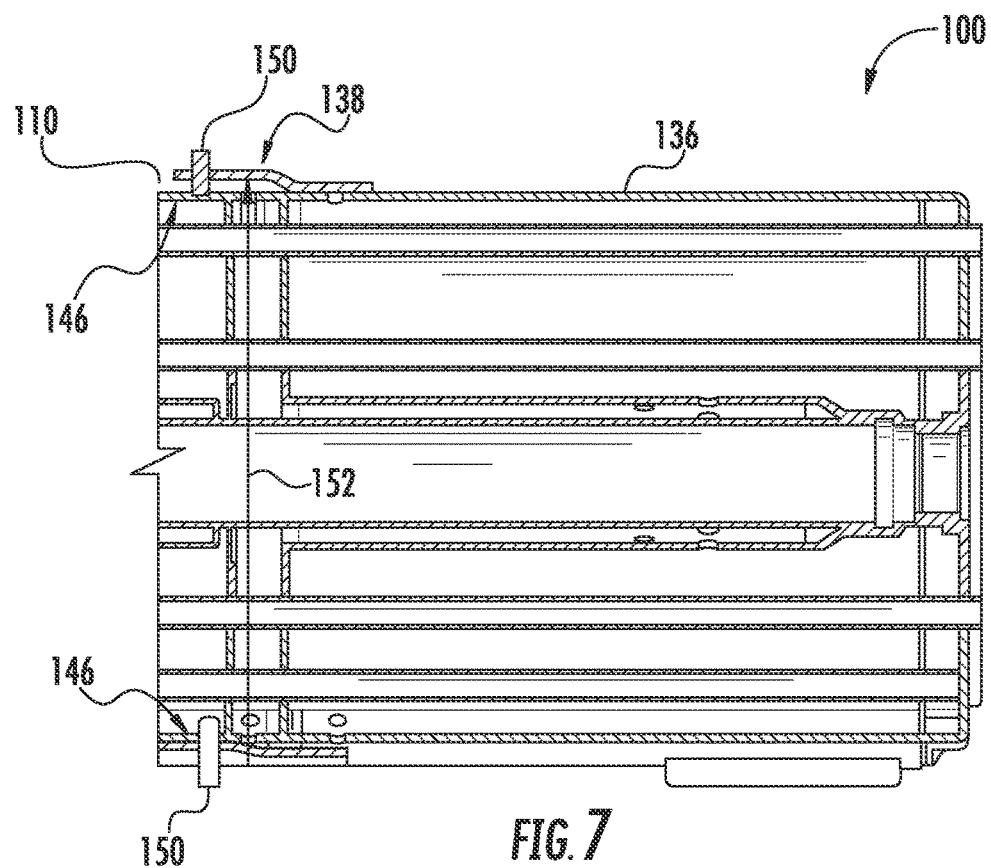
FIG. 7 is an enlarged cross section side view of a portion of the fuel injector as shown in FIG. 3, according to one embodiment of the present invention.
Figure 8:
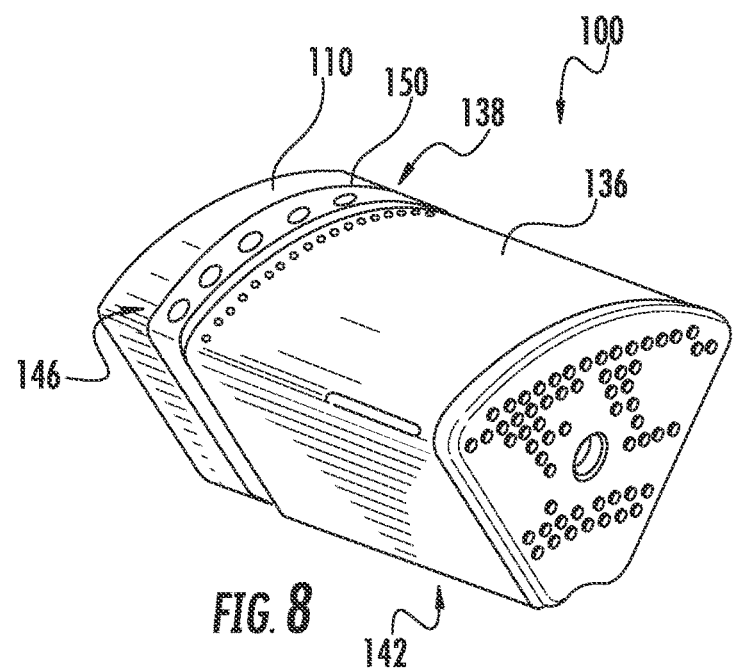
FIG. 8 is a perspective side view of the fuel injector as shown in FIG. 3, according to one embodiment of the present invention.

In one embodiment, as shown in FIGS. 7 and 8, the forward portion 138 of the outer shroud 136 is configured to receive at least a portion of the aft end portion 146 of the outer band 110. For example, the forward portion 138 of the outer shroud 136 may form a socket 152. The socket 152 has an inner diameter that is greater than an outer diameter of the aft end portion 146 of the outer band 110. When assembled, the aft end portion of the outer band 110 is seated within the socket 152. The outer band 110 and the outer shroud 136 are coupled together via one or more of the one or more fasteners 150. In one embodiment, the fasteners extend generally radially through and/or between the outer band 110 and the outer shroud 136.

The various embodiments provided herein, provide various technical advantages over existing bundled tube fuel injectors. For example, the one or more fasteners 150 that extend between the outer shroud 136 and the outer band 110 eliminate the need for a welded joint. One advantage of these embodiments includes the ability to disassemble the outer shroud 136 and/or the outer shroud assembly 142 from the fuel injector 100 without cutting through the outer shroud 136 and/or the outer band 110. As a result, the pre-mix tubes may be exposed for inspection, repair or replacement without damaging the outer shroud 136 and/or the outer band 110, thus saving overall inspection and maintenance costs and eliminating time consuming machining steps such as polishing, grinding and welding of the outer shroud 136 and/or the outer band 110 in order to prep and reassemble the bundled tube fuel injector 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A bundled tube fuel injector, comprising:
an outer band circumferentially surrounding a fuel plenum defined within the bundled tube fuel injector, the outer band having an aft end portion;
a plurality of pre-mix tubes that extend through the fuel plenum substantially parallel to one another, wherein a first segment of the plurality of pre-mix tubes are circumferentially surrounded by the outer band; and
an outer shroud that extends circumferentially around a second segment of the pre-mix tubes, the outer shroud having a forward portion and an aft portion;
an aft plate extends radially and circumferentially across the aft portion of the outer shroud, wherein the aft plate is rigidly connected to the aft portion of the outer shroud and the plurality of pre-mix tubes extends through the aft plate via a corresponding plurality of tube tip passages defined by the aft plate;
wherein a portion of the outer band extends axially across a portion of the outer shroud with respect an axial centerline of the bundled tube fuel injector;
wherein the aft end portion of the outer band is coupled to the forward portion of the outer shroud via a plurality of fasteners that extend radially through the outer band and the outer shroud with respect to the axial centerline of the bundled tube fuel injector.

2. The bundled tube fuel injector as in claim 1, wherein the aft end portion of the outer band overlaps the forward portion of the outer shroud.

3. The bundled tube fuel injector as in claim 1, wherein the forward portion of the outer shroud overlaps the aft end portion of the outer band.

4. The bundled tube fuel injector as in claim 1, wherein the plurality of fasteners comprises at least one of pins, rivets, screws and bolts.

5. The bundled tube fuel injector as in claim 1, wherein the plurality of fasteners is spring loaded.

6. The bundled tube fuel injector as in claim 1, wherein the outer band at least partially defines the fuel plenum.

7. The bundled tube fuel injector as in claim 1, wherein the outer shroud at least partially defines a cooling air plenum surrounding a portion of the pre-mix tubes.

8. The bundled tube fuel injector as in claim 1, further comprising an impingement plate that extends radially and circumferentially across the aft portion of the outer shroud upstream from the aft plate, wherein the plurality of pre-mix tubes extend through the impingement plate.

9. A combustor comprising:
an end cover coupled to an outer casing that surrounds the combustor;
a bundled tube fuel injector coupled to the end cover and extending axially downstream from the end cover, wherein the bundled tube fuel injector comprises:
an outer band circumferentially surrounding a fuel plenum defined within the bundled true fuel injector, the outer band having a forward end portion axially separated from an aft end portion;
a plurality of pre-mix tubes that extend through the fuel plenum substantially parallel to one another, wherein a first segment of the plurality of pre-mix tubes are circumferentially surrounded by the outer band; and
an outer shroud that extends circumferentially around a second segment of the pre-mix tubes, the outer shroud having a forward portion and an aft portion;
an aft plate that extends radially and circumferentially across the aft portion of the outer shroud, wherein the aft plate is rigidly connected to the aft portion of the outer shroud and the plurality of pre-mix tubes extends through the aft plate via a corresponding plurality of tube tip passages defined by the aft plate;
wherein a portion of the outer hand extends axially across a portion of the outer shroud with respect an axial centerline of the bundled tube fuel injector;
wherein the aft end portion of the outer band is coupled to the forward portion of the outer shroud via a plurality of fasteners that extend radially through the outer hand and the outer shroud with respect to the axial centerline of the bundled tube fuel injector.

10. The combustor as in claim 9, wherein the aft end portion of the outer band overlaps the forward portion of the outer shroud.

11. The combustor as in claim 9, wherein the forward portion of the outer shroud overlaps the aft end portion of the outer band.

12. The combustor as in claim 9, wherein the plurality of fasteners comprises at least one of pins, rivets, screws and bolts.

13. The combustor as in claim 9, wherein the plurality of fasteners is spring loaded.

14. The combustor as in claim 9, wherein the outer band at least partially defines the fuel plenum.

15. The combustor as in claim 9, wherein the outer shroud at least partially defines a cooling air plenum surrounding a portion of the pre-mix tubes.

16. The bundled tube fuel injector as in claim 9, further comprising an impingement plate that extends radially and circumferentially across the aft portion of the outer shroud upstream from the aft plate, wherein the plurality of pre-mix tubes extend through the impingement plate.

17. A gas turbine comprising:
a compressor;
a combustor disposed downstream from the compressor, wherein the combustor is surrounded by an outer casing and an end cover coupled to the outer casing;

a turbine disposed downstream from the combustor;
wherein the combustor comprises:
- a bundled tube fuel injector that extends axially downstream from the end cover, wherein the bundled tube fuel injector comprises:
  - an outer band circumferentially surrounding a fuel plenum defined within the bundled tube fuel injector, the outer band having a forward end portion axially separated from an aft end portion;
  - a plurality of pre-mix tubes that extend through the fuel plenum substantially parallel to one another, wherein a first segment of the plurality of pre-mix tubes are circumferentially surrounded by the outer band; and
  - an outer shroud that extends circumferentially around a second segment of the pre-mix tubes, the outer shroud having a forward portion and an aft portion;
  - an aft plate that extends radially and circumferentially across the aft portion of the outer shroud, wherein the aft plate is rigidly connected to the aft portion of the outer shroud and the plurality of the pre-mix tubes extends through the aft plate via a corresponding plurality of tube tip passages defined by the aft plate;
  - wherein a portion of the outer band extends axially across a portion of the outer shroud with respect an axial centerline of the bundled tube fuel injector;
  - wherein the aft end portion of the outer band is coupled to the forward portion of the outer shroud via a plurality of fasteners that extend radially through the outer band and the outer shroud with respect to the axial centerline of the bundled tube fuel injector.

18. The gas turbine as in claim 17, wherein the aft end portion of the outer band overlaps the forward portion of the outer shroud.

19. The gas turbine as in claim 17, wherein the forward portion of the outer shroud overlaps the aft end portion of the outer band.

20. The gas turbine as in claim 17, wherein the plurality of fasteners comprises at least one of pins, rivets, screws and bolts.

* * * * *